US007734364B2

(12) United States Patent
Wesemann et al.

(10) Patent No.: US 7,734,364 B2
(45) Date of Patent: Jun. 8, 2010

(54) MIXING MEDIA FILES

(75) Inventors: Darren L. Wesemann, North Salt Lake, UT (US); Jeffrey Hays, Sandy, UT (US)

(73) Assignee: LOLO, LLC, Salt Lake City, UT (US)

( * ) Notice: Subject to any disclaimer, the term of this patent is extended or adjusted under 35 U.S.C. 154(b) by 645 days.

(21) Appl. No.: 11/427,601

(22) Filed: Jun. 29, 2006

(65) Prior Publication Data

US 2007/0014422 A1 Jan. 18, 2007

Related U.S. Application Data

(63) Continuation-in-part of application No. 11/074,879, filed on Mar. 8, 2005, and a continuation-in-part of application No. 11/383,921, filed on May 17, 2006.

(60) Provisional application No. 60/682,361, filed on May 18, 2005.

(51) Int. Cl.
*G06F 17/00* (2006.01)

(52) U.S. Cl. .......................................... 700/94; 381/56

(58) Field of Classification Search .................. 381/56, 381/57, 104, 107, 119; 482/1, 3, 9, 148
See application file for complete search history.

(56) References Cited

U.S. PATENT DOCUMENTS

| | | | | |
|---|---|---|---|---|
| 6,311,155 | B1 | 10/2001 | Vaudrey et al. | |
| 6,351,733 | B1 | 2/2002 | Saunders et al. | |
| 6,408,315 | B1 | 6/2002 | McManus et al. | |
| 6,458,060 | B1 | 10/2002 | Watterson et al. | |
| 6,529,584 | B1 | 3/2003 | Ravago et al. | |
| 6,564,380 | B1 | 5/2003 | Murphy | |
| 6,600,898 | B1 | 7/2003 | D Bonet et al. | |
| 6,640,145 | B2 | 10/2003 | Hoffberg et al. | |
| 6,641,523 | B2 | 11/2003 | Ashenden | |
| 6,658,062 | B1 | 12/2003 | Nakatsuyama | |
| 6,769,028 | B1 | 7/2004 | Sass et al. | |
| 6,772,127 | B2 | 8/2004 | Saunders et al. | |
| 6,778,869 | B2 | 8/2004 | Champion | |
| 6,808,473 | B2 * | 10/2004 | Hisano et al. | 482/8 |
| 6,850,252 | B1 | 2/2005 | Hoffberg | |
| 7,135,637 | B2 * | 11/2006 | Nishitani et al. | 84/723 |
| 2004/0028245 | A1 * | 2/2004 | Gierse | 381/104 |
| 2006/0203972 | A1 | 9/2006 | Hays | |
| 2006/0265730 | A1 | 11/2006 | Hays | |
| 2007/0014537 | A1 | 1/2007 | Wesemann | |
| 2007/0016928 | A1 | 1/2007 | Wesemann | |
| 2007/0016929 | A1 | 1/2007 | Wesemann | |
| 2007/0016930 | A1 | 1/2007 | Wesemann | |
| 2007/0162933 | A1 | 7/2007 | Hays | |

* cited by examiner

*Primary Examiner*—Walter F Briney, III

(57) ABSTRACT

Mixing individualized media content. When individualized media content is generated from separate media clips or files, mixing the separate media clips includes controlling the audio. The volume of the audio in each clip is determined and normalized with respect to other media clips as the individualized media content is mixed. This provides a consistent audio experience even when the media content is generated from multiple sources having different properties. When more than one track of audio is present, such as voice audio and background music, the volume of one track is lowered such that the other audio track is audible. The volume of the background music, for example, is reduced such that the subscriber can hear the instructions in the voice audio.

18 Claims, 13 Drawing Sheets

MIXING MEDIA FILES

CROSS-REFERENCE TO RELATED APPLICATIONS

This application is a continuation-in-part of U.S. patent application Ser. No. 11/074,879 filed Mar. 8, 2005 and entitled METHOD AND SYSTEM FOR AUDIO PROGRAM CREATION AND ASSEMBLY. This application is also a continuation-in-part of U.S. patent application Ser. No. 11/383,921 filed May 17, 2006 and entitled METHOD AND SYSTEM FOR MIXING AND PRODUCING INDIVIDUALIZED MEDIA FILES, which claims the benefit of U.S. Provisional Patent Application Ser. No. 60/682,361 filed May 18, 2005. The foregoing patent applications are hereby incorporated by reference in their entirety.

BACKGROUND OF THE INVENTION

1. The Field of the Invention

The present invention relates to the field of mixing and producing media content. More particularly, embodiments of the invention relate to systems and methods for adjusting volumes of the components that are mixed together.

2. The Relevant Technology

Audio mixing relates to combining separate audio media components to produce a single combined output audio media. A problem arises, however, where the separate audio media components have different attributes such as different volume or content attributes. For example, a first audio media may have a greater intensity of sound (i.e. volume) when output on the same audio device as another audio media. In other words, the volume of the one media often differs from the volume of another media. Moreover, audio media is often recorded on separate equipment, under different circumstances, or have other content attributes that cause differences when played. As a result, mixing different audio media components together results in unsatisfactory output media. Abrupt changes in volume, pace, and the like can be disconcerting to a listener.

Moreover, some of the media components may have other attributes that are not accounted for in conventional mixing methods. For example, the content of a first audio media may be more important than the content of a second audio media being mixed with the first audio media (or any number of audio media having any relative content importance). Thus, the content of a first audio media may make the first audio media more important to be perceived than another audio media being mixed with the first audio media. Thus, mixing separate audio media having different relative content attributes has often created inconsistent and unsatisfactory mixed audio media.

Therefore, there is a need for improved mixing of audio media. Moreover, there is a need to create customized instruction audio, such as personalized workouts, where volume of the audio has been adjusted during mixing to increase and the consistency of the mixed audio media.

BRIEF SUMMARY OF THE INVENTION

Embodiments of the invention overcome these and other problems are related to mixing media from multiple media components or clips. Note that these embodiments are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method of mixing separate audio media is disclosed. The method includes accessing the separate audio media. The method further includes adjusting a volume attribute of at least one of the separate audio media. The volume adjustment may include determining a volume level of each audio media, normalizing volume levels of the separate audio media, comparing the volume level of at least one audio media to an associated desired volume level, and increasing or decreasing the volume level of the at least one audio media based on the comparison of the volume level with the desired volume level. The method further includes combining the separate audio media to produce a combined audio media, which is an example of individualized media content.

A media mixing and production module is disclosed. The media mixing and production module includes a database, wherein the database includes a plurality of scriptlets or media clips. The media mixing and production module further includes an audio normalizing and mixing module that accesses separate audio media clips and combines the separate audio media clips. The audio mixing module includes a normalizing function configured to determine a volume level of each audio media clip, adjust (such as by multiplying in one embodiment) the volume level of each audio media by a suitable constant or scalar so that the volume level of each audio media then has norm one, compare the volume level of each audio media to an associated desired volume level, and increase or decrease the volume level of each audio media based on the comparison of the volume level with the associated desired volume level. The media mixing and production module further includes an audio mixing function configured to combine the separate audio media linearly or in another manner to produce a combined audio media.

Additional features and advantages of the embodiments disclosed herein will be set forth in the description which follows, and in part will be obvious from the description, or may be learned by the practice of the invention. The features and advantages of the embodiments disclosed herein may be realized and obtained by means of the instruments and combinations particularly pointed out in the appended claims. These and other features of the embodiments disclosed herein will become more fully apparent from the following description and appended claims, or may be learned by the practice of the embodiments disclosed herein as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE INVENTION

Figure 1:
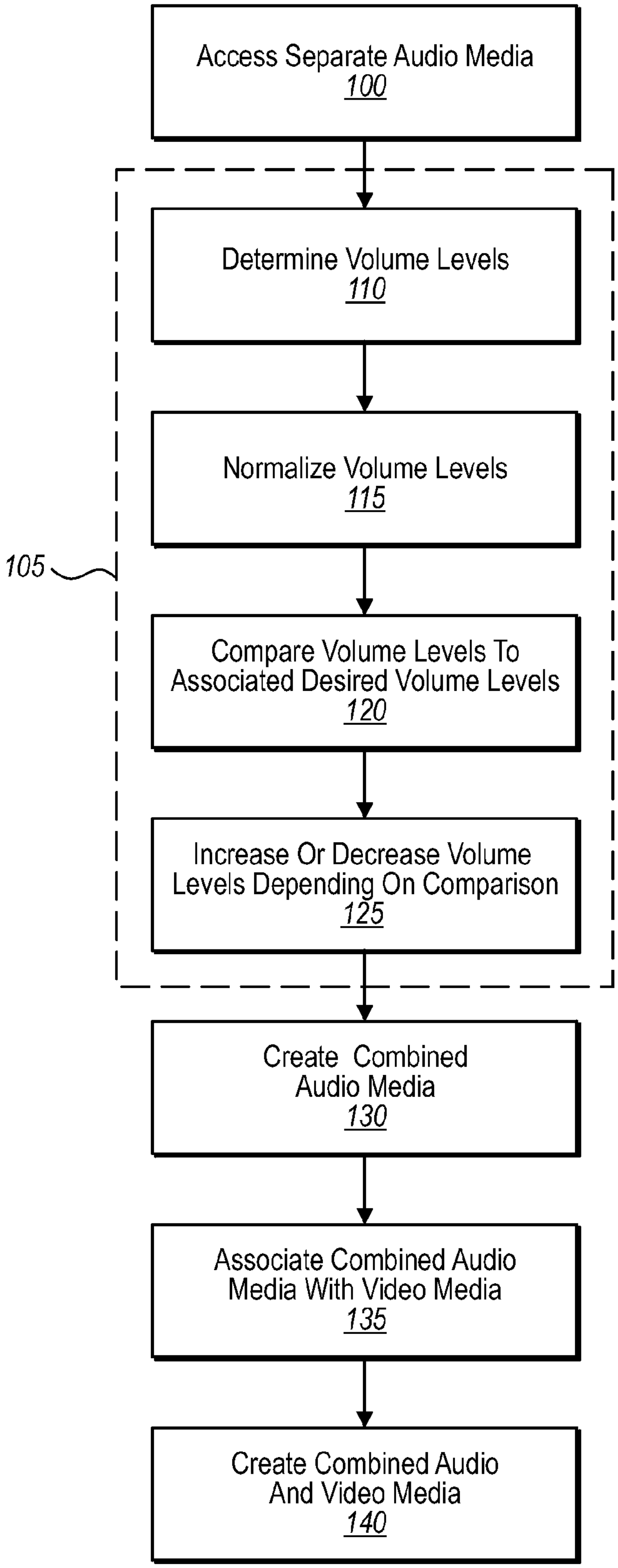
FIG. 1 illustrates an exemplary method of mixing separate audio media components or clips.

The embodiments of the invention described herein relate to methods, systems, and/or computer program products for mixing media. More particularly, embodiments of the invention relate to mixing multiple media clips or media components into a single media file. The audio media can be mixed such that volume levels of the audio media are varied based on content of the audio media and/or for other bases or attributes. The audio media can also be combined with video media and/or text for display on a screen when the mixed audio media is output, for example via a speaker on an electronic device.

Some embodiments of the invention generate media content that combines pre-defined content with content that represents the expertise and experience of other subject matter experts. The pre-defined content and the content from subject matter experts is stored in a database (referred to herein as a knowledge base). The development of the knowledge base can develop over time as additional subject matter experts add content add to the pre-defined content. In one example, the pre-defined content serves as building blocks for the subject matter experts. For example, certain subject matter experts may provide the pre-defined content for a knowledge base that is developed for fitness or exercise. The pre-defined content may relate to definitions or descriptions of exercise equipment, weight amounts, equipment capabilities, physiological definitions and the like. Other subject matter experts can then select from the pre-defined content or building blocks to develop an exercise routine. A subject matter expert, for example, may prescribe the use of particular equipment, at a particular weight for some period of time. In this manner, a subject matter expert can develop various routines that are associated with the pre-defined content. Additionally, the content provided by subject matter experts can be analyzed and adapted according to attributes of a subscriber without requiring the subject matter expert to provide routines for every possible situation or condition.

A subscriber can then provide his or her own information (often represented by subscriber attributes), which is used to access the knowledge base and identify specific data, for example, media clips, that suit the subscriber. The identified media can then be mixed and provided to the subscriber. During the mixing of the media, attributes of the subscriber can also be taken into consideration and desirable volume levels can be associated with the identified media such that the combined media content is most enjoyable by the subscriber. In this manner, the media content delivered to the subscriber includes content from subject matter experts and that is individually tailored to the subscriber.

Some embodiments of the invention are directed towards media content that is directed to health issues, such as information relating to diet and general health information, exercise, proper use of exercise equipment, proper techniques for different exercises, etc. The media content can include personalized instructions for a workout routine that enable users to have the benefit of personal trainers. One of skill in the art can appreciate, with the benefit of the present disclosure, that the media content, the knowledge base, and the like can be developed for other activities or sessions as well and include content directed to other subjects other than exercise. In other words, the subject of the knowledge base is not limited to exercise, but includes other subjects such as travel and education. In each case, individualized media content can be developed according to the subject of the knowledge base.

When generating the media content, information can be received and/or collected from various experts, administrators, and/or individual subscribers (users) to manage information and rules for correlating the information to generate individualized exercise programs for the individual user. This information may be collected or received over a network, such as the Internet, and stored in a server. The stored information can then be coordinated to generate specific instructions for a user that can be delivered to the user as media content such as a media clip that includes audio, text, and/or video media.

For example, the exercise programs can be generated by a computer managed server that interacts with various entities via a network, such as the Internet. The server can present a graphical user interface, such as a website or webpage, such that the server can receive information from the entities to be input that is used for defining desired volume levels and generating the individualized exercise media content. The different entities that provide attributes and rules can include different entities that include subject matter experts, subscribers, and administrators. The subject matter experts can be divided into various groups that provide different data as described below. Knowledge engineers are examples of subject matter experts. When the media content is related to exercise, trainers are also examples of subject matter experts. The bulk of the information, however, can be provided by the knowledge engineers, trainers, and subscribers rather than the administrators who may be responsible for the general maintenance of the user accounts, systems and database infrastructure at the server. Various aspects of the mixing and volume control can be defined by input received from any of these entities. In alternative embodiments, the control of the volume is independent of the subject matter experts and controlled by the expert system.

The knowledge engineer can be referred to as an internal Subject Matter Expert (SME) responsible for internal predefined content stored at the server. This predefined content can include the various tables including attributes and exercises, for example, for selection by subscribers and trainers. The knowledge base includes content that is defined and maintained by the internal subject matter expert. In one embodiment, the pre-defined content includes building blocks that can be customized by external SMEs. The knowledge engineer can also associated desired volume levels to preferred content or content defined by some other attribute.

The knowledge base of predefined content also includes media clips or scriptlets that have various attributes. An internal SME can access these media clips and perform various maintenance functions (add, delete, amend, etc.). For example, exercise media clips may have attributes that define which body part is being used, what equipment should be used, how the exercise should progress, and the like. Different desired volume levels can be associated with media clips based on any of the these attributes.

The trainer can be referred to as an external SME responsible for defining training philosophies in terms of methods, rules, and attributes. These philosophies can be combined with the pre-defined content submitted by the knowledge engineer and included in the knowledge base. In turn, the knowledge base can be used to generate and provide the individualized workouts to the subscribers. The trainers can define or modify desired volume level associations as well.

The subscriber is the entity for which the individualized media content is generated. The subscriber provides subscriber attributes, which may include information such as updates regarding subscriber fitness progress, and subscriber goals. This information provided by the subscriber is compared with the information received by the server from the knowledge engineer and trainers to match the subscribers attributes, progress, and goals with various scripts or scriptlets to create a matching individualized exercise program. Subscriber attributes as well as preferences can also be used to associate desired volume levels with media.

The various information received from the subject matter experts (e.g., knowledge engineer, trainer) and from the subscriber can be stored as data structures, such as tables and table entries, in computer readable media along with identifiers and associations with other data structures in order to create rules for generating individualized training programs and controlling volume levels during mixing.

The individualized training programs can be generated according to a template, which may be predetermined, and the template used can create associations between data structures to be used as inputs to rules for selecting media clips and/or customizing media clips or other media content. For example, an individualized training program template can include any combination of a (1) pre-workout introduction, (2) warm-up, (3) exercise, including an exercise introduction, description, instructions, tips, etc., (4) set, including a count through repetition of a set, (5) warm-down, and (6) post-workout conclusion. Each of the various aspects of the program template can be part of the pre-defined content of the knowledge base.

Each portion of a training program template can have different desired volume levels associated with corresponding audio media. Thus, a preworkout introduction portion of an individualized training program can have different desired volume levels associated with media content than an exercise portion of the individualized training program template. In this manner, the volume levels of components of mixed audio can be varied based on the content of the audio media and/or based on an associated portion of a program template.

The association of a desired volume level with audio media can be based on the content of the audio media. A portion of the individualized training program template can have a desired volume level associated with audio media including instruction content but a different desired volume level associated with audio media including background music content. In some embodiments, a volume level of media including background music content can be decreased when mixed with media including instruction content such that a subscriber can more easily hear the instructions without being distracted by the background music.

Moreover, the desired volume levels can be associated with media based on attributes or preferences of entities such as subscribers, trainers, subject matter experts, and administrators. Where a subscriber is older, more experienced, or is hearing impaired, for example, these attributes, as well as any other subscriber attribute, can be taken into consideration to vary the desired volume level associated with media. In addition, a subscriber can provide an input so as to vary the desired volume level associated with content according to personal preferences. Changes to the desired volume level associated with media can be effected to media including a type of content or can be effected to any number of media mixed equally. For example, in some embodiments, only the desired volume level of media including background content may be varied based on a subscriber attribute or input, but not the desired volume level of media including instruction content. Thus, volume levels, and relative volume levels, can be varied so as to improve the consistency of the individualized mixed media. Each portion of the individualized training program can be generated based on different rules taking into account certain information (such as the subscriber attributes) received from the subscriber.

These, as well as many other, aspects of the various embodiments discussed in detail below are also illustrated in the Figures referred to herein.

Once a knowledge base has been accessed and the media clips needed to generate individualized media content have been identified, the various media clips are then mixed together. However, some of the media clips may have been provided by different subject matter experts, recorded at different times or in different formats. As described above, the volume of each clip typically differs from the volume associated with the other identified clips. Embodiments of the invention relate to methods for mixing the media clips in a manner that compensates the various volume levels to provide a desired volume or range of volumes in the resulting media content. Because audio data may overlap or come from different sources in the media content, embodiments of the invention can alter volume levels such that audio clarity is achieved. For example, the media clips may be mixed such that the background music decreases in volume whenever voice is present in another clip. For example, the volume of the background music is decreased when the subscriber is receiving verbal instructions.

FIG. 1 illustrates an exemplary method of mixing separate audio media components. Separate audio media is accessed (100). The separate audio media can include at least two audio clips. The audio clips can have different content. For example, a first audio clip can include instruction content. The instruction content can be any instruction content. For example, the instruction content can be exercise instructions and/or instructions describing health related information. A second audio clip can include music content. For example, the music content can be background music to be mixed with the instructions.

The audio media can be accessed from any source. For example, the audio media can be accessed from a local or remote computer readable medium, such as a database. The audio media can also be accessed from an online music source. The audio media can be accessed from any number of different sources. For example, one audio media file can be accessed from a different source, such as an online web server hosting an online individualized fitness program. A second audio media file can be accessed from a different online server hosting a music service.

A volume attribute of at least one of the audio media is adjusted (105). Adjusting the volume attribute can include determining a volume level of each audio media (110), normalizing volume levels of the separate audio media (111) such that they are based on the same scale, comparing volume levels of at least one of the audio media to a desired volume level associated with that audio media (120), and increasing or decreasing the volume level of the at least one audio media based on a result of the comparison of the volume level with the desired volume level (125). The volume level of each audio media may be measured in terms of decibels, for example.

Normalization of audio signals (115) can be accomplished according to any known method. For example, the normalization of the volume levels (115) can be accomplished by multiplying the volume level of each audio media by a suitable constant or scalar so that the volume level of each audio media is normalized. Normalization may be performed where the audio media includes audio files of different formats. In addition, the audio content of different files may have been recorded under different circumstances or using different equipment resulting in different relative volume levels (i.e. decibels) when output.

The desired volume level associated with a particular audio media can be associated on any basis. For example, the desired volume level can be associated with the audio media based on a content of the audio media, a particular portion of a program template to which the audio media applies, an attribute of an entity, or based on any other criteria.

The volume level of the audio media can be increased or decreased based on a result of the comparison of the volume level with the associated desired volume level (125). After the volume level of the separate audio media is adjusted to the desired volume level, the separate audio media are combined to create a combined audio media (130). This combined audio media can be an audio file including both instruction and background music. The instruction can include fitness and exercise related information. The background music can be selected by a subscriber. According to embodiments where only a combined audio file is created this is can be the final process according to such embodiments.

The combined audio media can also be associated with video media (135). For example, video media can visually illustrate the instructions contained in the combined audio media. According to fitness embodiments, the video media can include visual illustrations of a person carrying out exercises or other activities during part of the instructions. The video media can also include video of the trainer from which the subscriber is receiving instruction. The video media can also include text. For example, the video media can include text to be visually displayed on a screen of an electronic device. The text can be associated with the audio and other video media.

A combined audio and video media can be created 140. This combined audio and video media can be output by an electronic device, stored in a computer readable medium, and/or can be transferred over a communications connection. The combined audio and/or video media created can be defined by a list of media generated by a method of creating individualized media content for a subscriber described in further detail below.

Figure 2A:
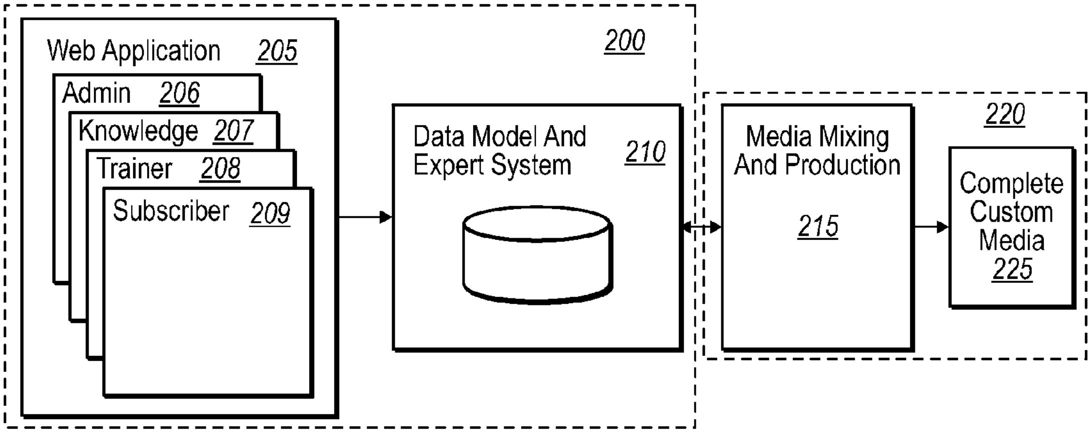
FIG. 2A is an illustration of an example of the various computer program modules and data processing engines that create individualized media.

FIG. 2A is a high-level illustration of various computer program modules and data processing engines that create individualized media content. FIG. 2A includes a first data processing device 200 (such as a server or server system) hosting a web application 205 that is used to gather information via an administrator module 206, knowledge engineer module 207, trainer module 208, and subscriber module 209. The knowledge engineer module 207 and trainer module 208 are examples of modules used to collect information from subject matter experts. In this example, the subject matter relates to exercise. As previously stated, however, the subject matter collected by subject matter expert modules is not limited to exercise, but extends to other activities or subjects. For example, embodiments of the invention can be used to customize study programs (the subject matter experts may be teachers or professors) where the media content is a customized lecture, trips (the subject matter experts may be travel agents) where the customized media content relates to an itinerary or to historical sites visited during a trip. Embodiments of the invention can be used to generate media content that can guide a user through a museum (or for other guided expeditions) based on the user's interests and information from subject matter experts that relates to the user's interests. Embodiments of the inventions generally apply to any situation where the knowledge or a subject matter expert can be customized into media content and delivered to a user.

This content provided by the various subject matter experts is stored as data structures by the first data processing device 200, such as a server hosting the web application. The data structures are accessed by a data modeling and expert engine 210 that compares the data structures according to rules to identify information submitted by the knowledge engineer and trainer that matches or is appropriate for information submitted by the subscriber.

The data model and expert engine 210 can associate the matched information with scriptlets or media or media clips created by the knowledge engineer module 207 and trainer module 208 or submitted from other source and creates a scriptlist or list of media clips that includes a list of identification information for each identified scriptlet. The scriptlist is then communicated to a media mixing and production module 215 within a second data processing device 220 or to the same processing device 200 in an alternative embodiment. The second data processing device 220 can be a computer terminal that requests the scriptlets from the first data processing device 200.

The first data processing device 200 hosting the web application 205 communicates the scriptlets to the media mixing and production module 215 executed at the second data processing device 220. The media mixing and production module 215 assembles the scriptlets according to the scriptlist to create the completed individualized media 225 and store the individualized media in a computer readable medium or upload the individualized medium 225 to a portable electronic device. The media mixing and production module 215 also controls volume levels of the media during mixing. The volume levels of the media can be varied during mixing as described in reference to FIG. 1.

Figure 2B:
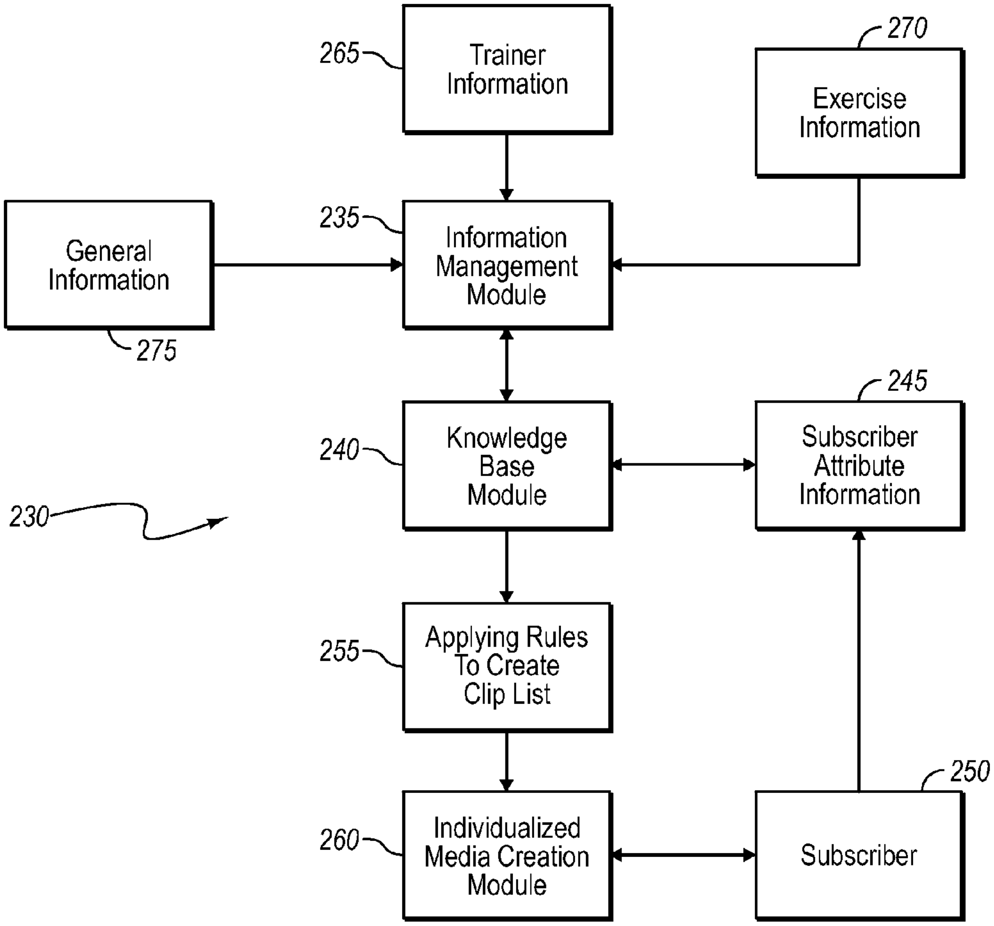
FIG. 2B is a flow diagram illustrating a process for creating individualized media.

FIG. 2B is a flow diagram illustrating a process 230 for creating individualized media. The process 230 uses a knowledge base module 240 for processing personalized subscriber attribute information retrieved by subscriber attribute information module 245 along with exercise and trainer information stored in an information management module 235 to create a list of scriptlets for selection and mixing by an individualized media creation module 260. The information management module 235 manages and stores information associated with scriptlets retrieved by a trainer information module 265 from trainers, exercise information module 270 from knowledge experts, and general information module 275 from knowledge experts.

Logic rules may then be applied 255 by comparing personal information from subscriber attribute information module 245 with exercise scriptlet information from information management module 235 to create a scriptlist. In some embodiments, the personal information is compared with metadata to identify the specific scriptlets or media clips. The scriptlist includes a list of media clips to be assembled to create individualized media using an individualized media creation module 260. Upon assembly, the individualized media is communicated to the subscriber 250. The subscriber 250 may upload the individualized media clips to a personal media player such as an MPEG audio layer 3 (.mp3) player or other personal media device.

Figure 3:
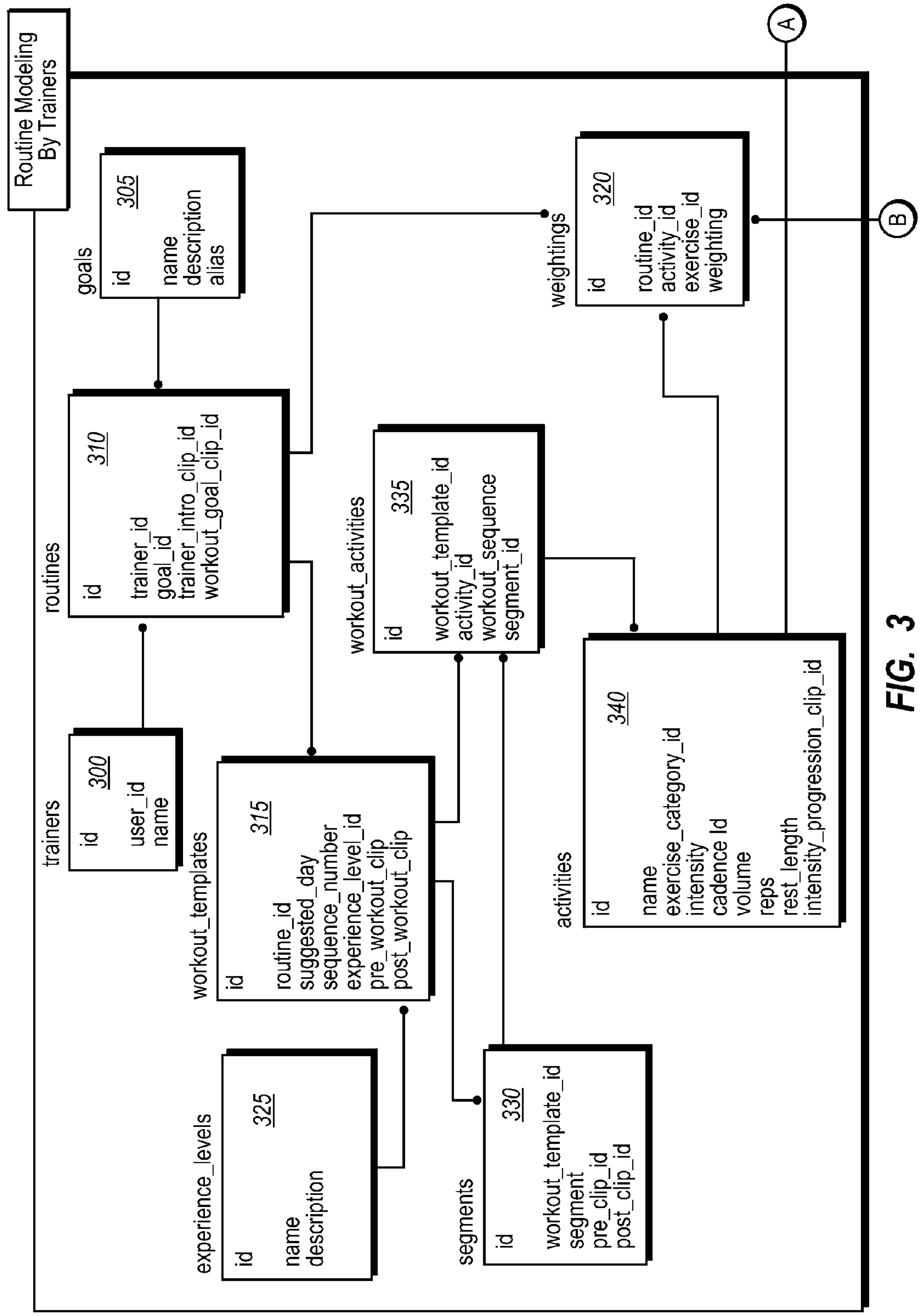
FIG. 3 illustrates various data structures created and stored by a trainer module.

FIG. 3 illustrates examples of data structures created and stored by a trainer module (or other subject mater expert module), such as trainer information module 170 in FIG. 1. The trainer module can provide a user interface for the trainers to define their unique workout philosophies. Selection of predefined exercises and attributes, together with the ability to add pre-workout and post-workout media content and volume control allow a customized environment for subscribers. A web-based GUI can be used for querying trainers and to record media that will be heard and/or viewed at the beginning and/or end of a workout or at any other time during the workout. More generally, the subject matter expert modules operate to collect the philosophies of the subject matter expert. As discussed above, embodiments of the invention, as described previously, are not limited to exercise media content.

Trainers can define methods which involve selecting an exercise and providing attributes. Examples of attributes include frequency (days per week), cadence, reps (number), sets (number), and rest (in seconds). Also, for each method, a range of attributes can be defined by the trainer. For example, the ranges of attributes can include age group (e.g., under 12 years, 12-18, 19-24, 25-32, 33-40, 42-50, 51-60, over 60 years, etc.), a goal (e.g,. fat loss, fitness, build muscle, stress reduction, medical, body shaping, activities of daily living, etc.), medical history (e.g., high blood pressure, diabetes, arthritis, cardiovascular disease, high cholesterol, high triglycerides, joint replacement, pregnancy, etc.), experience level (e.g., beginner, intermediate, advanced, etc.), endurance level (e.g., 15 min., 20 min., 30 min, etc.), fitness level (e.g., bad, semi, in shape, etc.), and availability (e.g., 2 days per week (dpw) for 1 hour, 3 dpw/30 min., 5 dpw/30 min., 5 dpw/1 hr, 6 dpw/1 hr, etc.). The trainer can associate desired volume levels based on these, or other, attributes. A GUI presentation including input fields, pull-down menus, and other means for the trainer to define the methods by various exercises and other attributes can be displayed.

A philosophy maintenance page of the website can control training goal, training goal body part, and training goal exercise tables and other data structures to establish a trainer philosophy. For each philosophy, goal, reps, cadence, frequency, and workout length can be defined. For each goal data structure, there can be two lists of data structures, one for body parts (including frequency and ordering) and one for exercises (including frequency).

The data structures created by trainers may include scriptlets, such as audio and/or video clips, from any number of trainers. Each trainer included in the trainer module provides the media clips along with identifiers for associating each media clip with the trainer's philosophies and workout routines. In some cases, one scriptlet may be associated with multiple identifiers. For example, some of the identifiers may identify the trainer, difficulty level, body parts targeted, goal of the exercise, exercise identification, exercise routine segment (i.e., pre-workout, warm-up, body, etc.), suggested frequency, suggested repetitions, cadence, etc. Some scriptlets may also include two identifiers of the same type. For example, one scriptlet may be associated with a warm-up for one difficulty level, and a main exercise for another difficulty level. Similarly, one exercise may target different body parts.

For example, referring still to FIG. 3, a particular trainer may be associated with a particular trainer data structure 300. The trainer data structure 300 can include an identifier assigned to the trainer and information describing the trainer's name and system identification. The trainer module can create goal data structures 305 including information associating the goal data structure with a goal identifier, goal name, description of the particular goal, and any aliases associated with the goal. Trainer routine data structures 310 can be created that include information identifying a particular routine. The trainer routine data structures 310 can include information that associates each trainer routine data structure 310 with a trainer identifier, goal identifier, trainer introduction clip identifier, and a workout goal clip identifier for accessing recorded scriptlets, such as audio media clips, associated with the particular routine.

The various data structures disclosed herein can include data stored in tables on a database coupled for access to the data by a server. These tables can include identifiers, descriptive information, associations with other data structures including audio and/or video clips.

Scriptlets data structures can be maintained in a single table and referenced in various places as set forth herein. Scriptlet attributes can include name (name of scriptlet to be reference within the system), physical file name (actual filename of media, e.g., .mp3 files), step (e.g., preworkout, warmup, exercise, set warmdown, postworkout, etc.), and description (text or description of the scriptlet).

Each routine data structure 310 can be associated with workout templates 315 and weightings data structures 320. Each workout template data structure 315 can include information such as a routine identifier, suggested day information, sequence number information, experience level information, and identifiers for associating the workout template with a particular pre-workout and post-workout recorded scriptlet. The workout template data structures 315 can be associated with a particular experience level data structure 325 that can include an experience level data structure identifier, name of the experience level information, and other descriptive information.

Each workout template data structure 315 can be associated with particular segments 330 and workout activities 335 data structures. The segments data structures 330 can include a segments data structures identifier, information describing the segment's associated workout template and segment name. The segments data structures 330 can also include identifiers of stored scriptlets of recorded media, such as trainer recorded audio to be heard by a subscriber prior to the particular segment or after the segment is performed. Each workout activity data structure 335 can include a workout activity identifier, information describing the workout template associated with the particular workout activity, and information describing a sequence of workout segments associated with the particular workout activity data structure 335.

Each workout activity data structure 335 can be associated with various activities data structures 340. Each activities data structure 340 can include an activity data structure identifier and information describing the associated activity's name, exercise category, intensity, cadence, volume, reps, rest length, and an identification of an intensity progression media scriptlet. The volume information can include an associated desired volume level. Each of the routines 310 and activities 330 data structures can also be associated with particular weightings data structures 320, which can include weightings data structure identifiers, associated routine identifiers, associated activities identifiers, associated exercise identifiers and a description of the weighting.

The various trainer data structures illustrated in FIG. 3 can be generated using inputs from a particular trainer accessing a web application, such as the training module 208 of the web application 205 of FIG. 2B. The trainer module 208 can query the particular trainer for training goals and associate these training goals to generate goal data structures 305 with trainer specified routines to create routine data structures 310, workout templates to create workout template data structures 305, experience levels to create experience level data structures 325, workout templates to create workout template data structures 315, and so on to generate the various data structures of FIG. 3. Any of the data structures of FIG. 3 can include information, such as the volume information of activities data structure 380 associating scripts identified by the data structure with volume levels.

Figure 4:
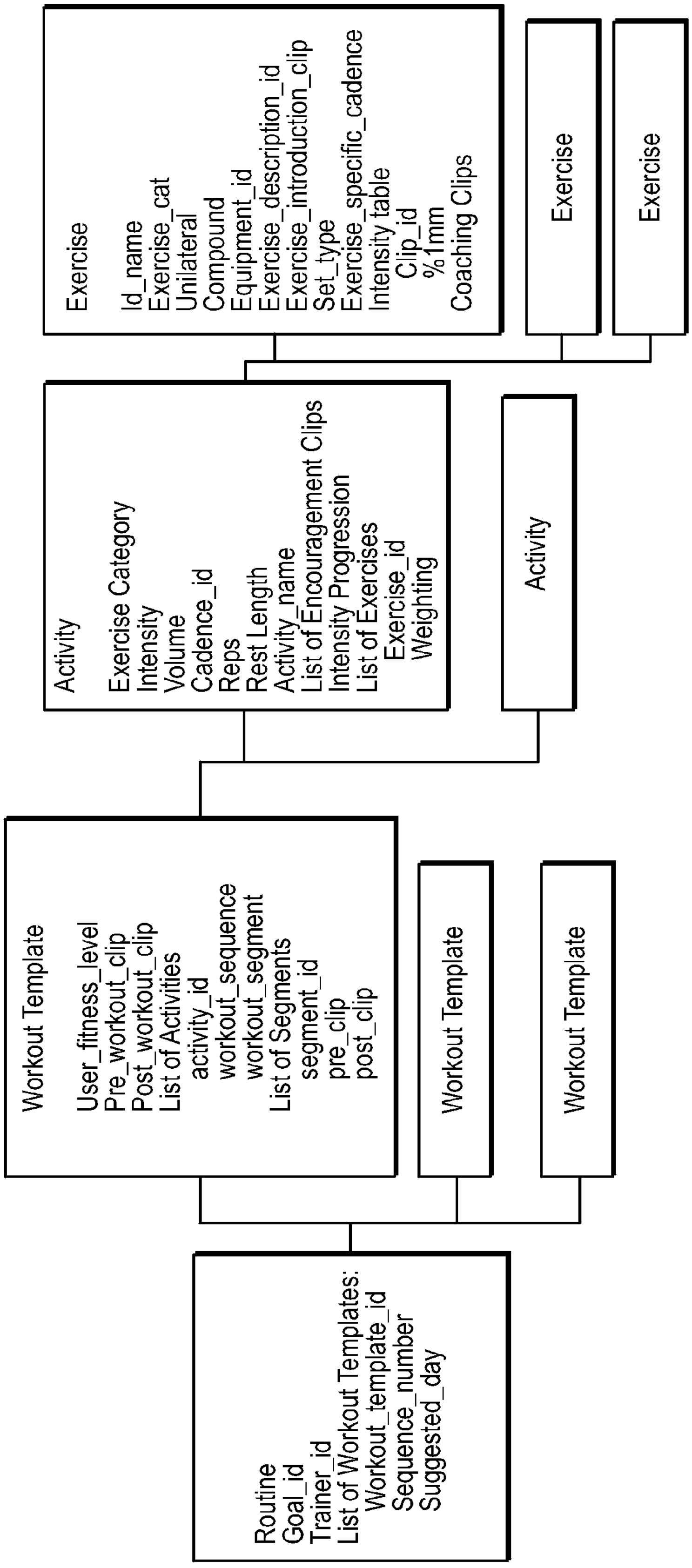
FIG. 4 is a block diagram illustrating various data structures that contain information about a trainer's philosophies.

Referring to FIG. 4, a block diagram example illustrating various data structures that contain information about a trainer's philosophies as they relate to goals (e.g., loose weight, build muscle, etc.), workout sequences, activities, and exercises, (i.e., for each trainer's goal, there are many workout templates/sequences, for which there are many activities, for which there are many exercises). The model 400 illustrated in FIG. 4 consolidates information that is shareable between data structures and ensures there is only one instance of the shared (or common) information in one embodiment. In other words, there need not be a whole set of exercise and activity definitions for each trainer but rather data structures can include identifiers associating them with other data structures. In this example, types of available exercises and activities don't vary from trainer to trainer, so exercise and activity data is "common" information, which only exists one time for each kind of exercise and activity. However, special attributes that are different from trainer to trainer can be maintained specifically for each trainer separate from the "common" activity and exercise data structures. This architecture can reduce the amount of information required to be captured by each trainer. Thus, only the data structures that change from trainer to trainer need be stored. The "common" information can be maintained in the information management module 235 of FIG. 2B so that the data does not have to be replicated.

Figure 5:
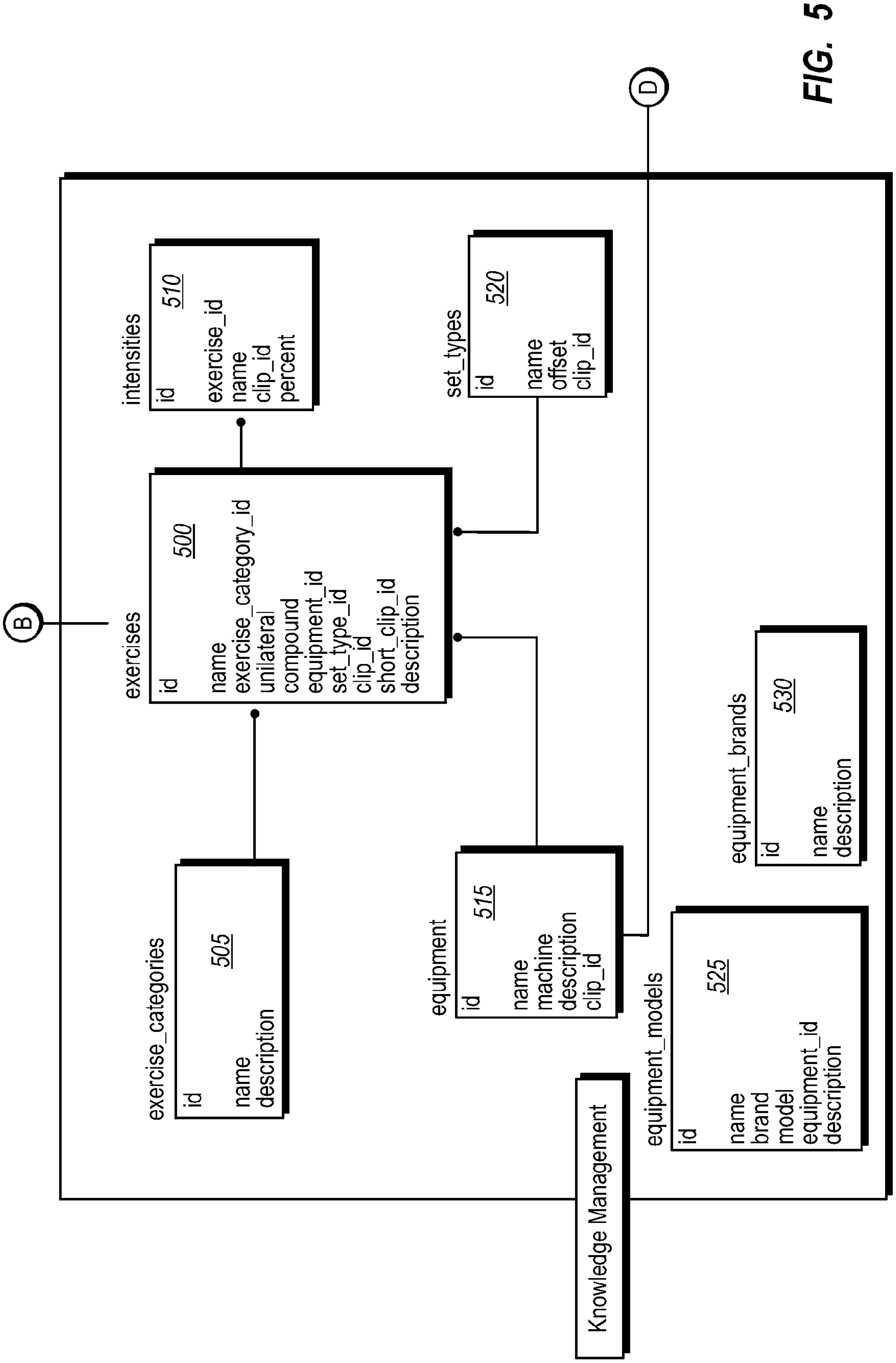
FIG. 5 illustrates various exercises data structures.

Referring to FIG. 5, various exercise related data structures are illustrated that are associated with the various activities data structures 340 of FIG. 3. Each exercise data structure 500 can also be associated with a particular exercise category data structure 505 and intensity data structure 510. The exercises 500 and/or intensities 510 can also include volume information for mixing purposes. The exercise data structure 500 can include an exercise identifier and information describing a name of the exercise and type of exercise and associated exercise category, equipment, and set type data structures. The exercise data structure 500 can also identify associated clips to be included in the subsequently generated individualized media.

Each exercise data structure 500 can be associated with particular equipment 515 and set type data structures 520. The set type data structure 520 can include a set type identifier, information describing the set, and identification of an associated media clip. Each equipment data structure 515 can include an equipment data structure identifier and information describing the name, machine, and descriptive information of the equipment. The equipment data structure 515 can also include an identification of a media clip associated with the particular equipment data structure. Additional data structures that may be included and associated with the equipment data structure illustrated in FIG. 5 are equipment model data structures 525 and equipment brand data structures 530.

The various data structures illustrated in FIG. 5 can be generated by the exercise information module 270 of FIG. 2B. The data structures of FIG. 5 can be generated by a knowledge engineer responding to queries using a web based application such as the web based application 205 of FIG. 2A. The knowledge engineer can create the various exercise data structures 500 as a set of options for selection by trainers and subscribers using the web based application 205. After the data structures of FIG. 5 are generated by the knowledge engineer, the various exercises defined by the exercise data structures 500 can be offered to the trainers using the web based application 205 to associate the various exercises with the routines, workout templates, segments, and activities selected by the trainer for a particular goal. Thus, the exercises data structures 500 of FIG. 5 can be the available building blocks for particular routines created by trainers using the trainer module 208 of the web application 205 to later generate media that satisfies a particular goal of a subscriber.

Figure 6:
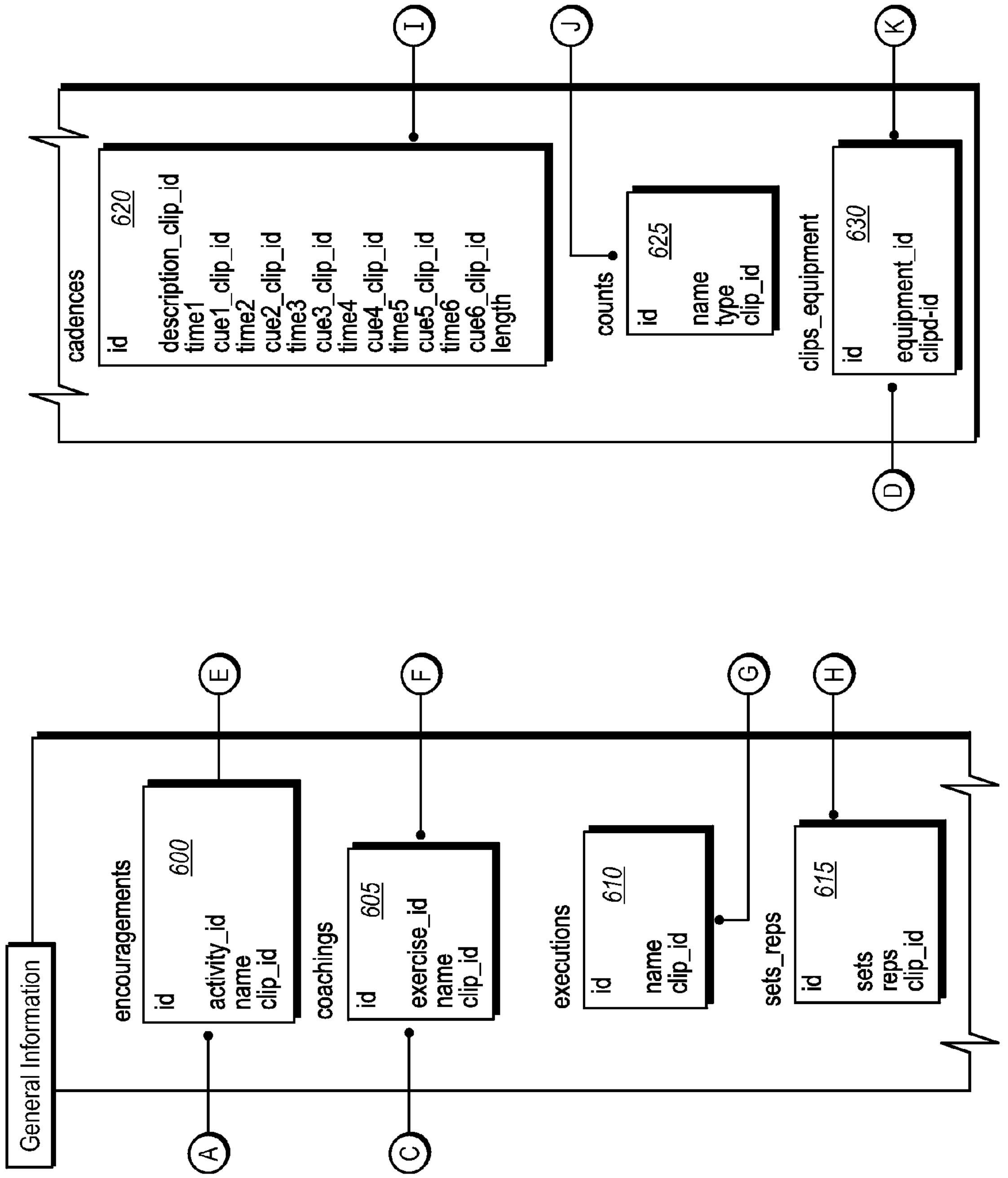
FIG. 6 illustrates various data structures that can be associated the exercise data structures of FIG. 5.

Referring to FIG. 6 various general information data structures are illustrated that can be associated with the exercise data structures of FIG. 5. For example, the data structures of FIG. 6 can be some of the building blocks for generating the media files associated with each of the exercise data structures of FIG. 5 and routine and activity data structures of FIG. 4. As shown in FIG. 6, encouragements data structures 600 can be associated with particular activity identifiers and can include clip identifiers associating the encouragements data structures 600 with particular media scriptlets.

Coaching data structures 605 can include exercise identifiers associating the coaching data structures 605 with particular exercises data structures 500 from FIG. 5. The coaching data structures 605 can include a coaching data structure identifier, name, and other identifiers associating the coaching data structure 605 with an associated media clip and exercise. Thus, coaching media clips can include rules associating them with particular exercises based on the coaching data structures 605.

Executions 610, sets reps 615, cadences 620, and counts 625 data structures can be associated with various media clips for the various exercises. The cadence data structures 620 relate to the portion of a workout where exercises are actually being executed. Cadence refers to the timing and pace of the execution (i.e., the counting, and format of the counting) for a particular exercise. Thus, the executions, sets, reps, cadences, and counts all combine to control the selection of media clips to control the timing, pace, repetitions, etc for each exercise. Clip equipment data structures 630 can also be generated for associating the particular equipment used, with associated media clips to be included in the individualized media generated.

The data structures illustrated in FIG. 6 can be generated using knowledge expert inputs to the knowledge expert module of the web application 205 of FIG. 2A. Thus, the knowledge expert can create the general and exercise data 270 and 275 of FIG. 2A by creating the encouragement 600, coaching 605, execution 610, sets-reps 615, cadences 620, counts 625, and equipment 630 data structures illustrated in FIG. 6 using a web-based GUI and associating these data structure building blocks with particular exercise data structures illustrated in FIG. 5. Thus, the exercises selected by trainers that makeup particular routines and workout templates associated with particular subscriber goals can be made of, in part, the data structures of FIG. 6.

Figure 7:
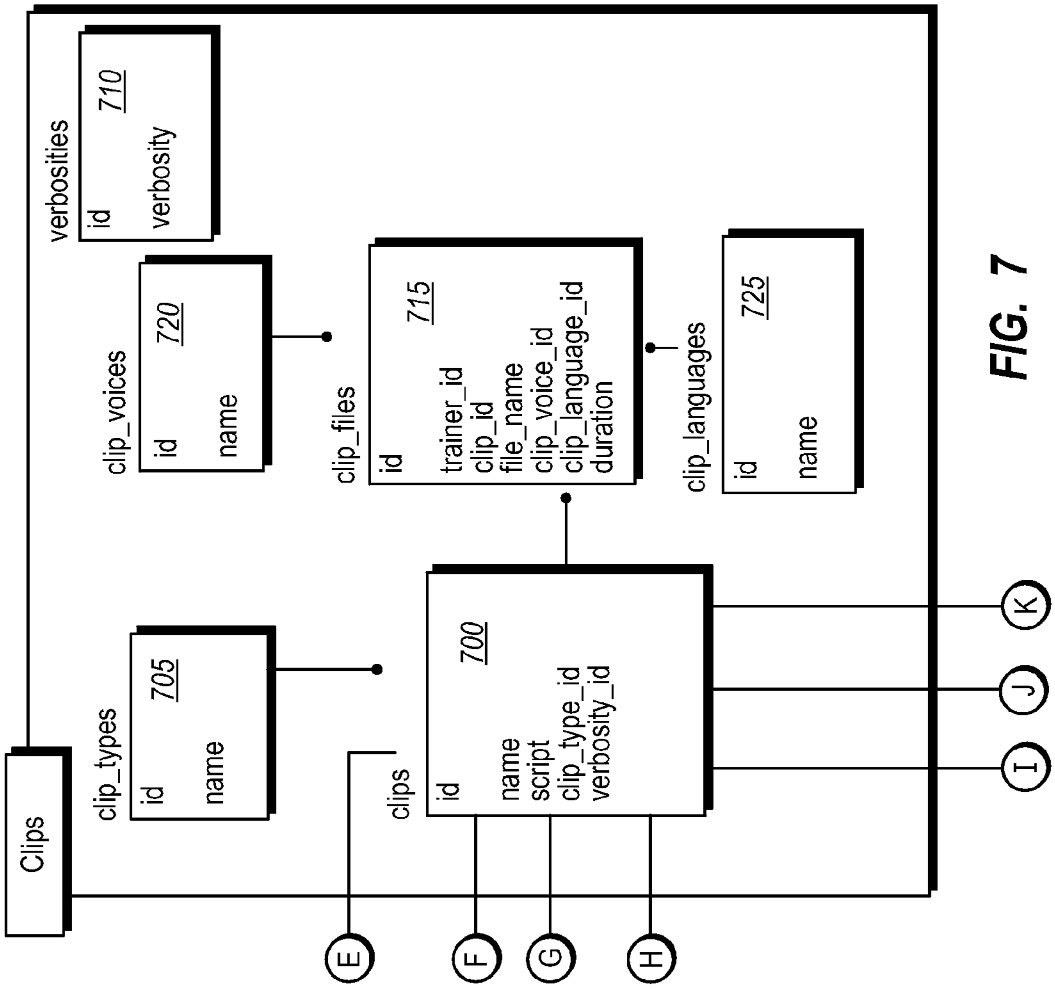
FIG. 7 illustrates various data structures for associating media clips with the data structures of FIGS. 4, 5, and 6.

Referring to FIG. 7, various data structures for associating media clips with the data structures of FIGS. 4, 5, and 6 are illustrated. Clips data structures 700 can include a clip identifier that is associated with the various data structures of FIGS. 4, 5, and 6. The clips data structures 700 can also include information associating the clip data structure 700 with a clip type 705 and verbosity 710 data structure along with information describing the name of the clip and script. The verbosity 710 can associate the various clips with a particular desired volume level. Clip files data structures 715 can include trainer, clip, clip voice, clip language identifiers for associating the clip files data structures 715 with particular trainer 300, clip 700, clip voice 720, and clip language 725 data structure. The clip types 705, clip voices 720, verbosities 710, and clip languages 725 data structures can be associated with the clip files data structures 715 in order to tailor to the media files selected to the particular subscriber for which the individualized media is generated.

Figure 8:
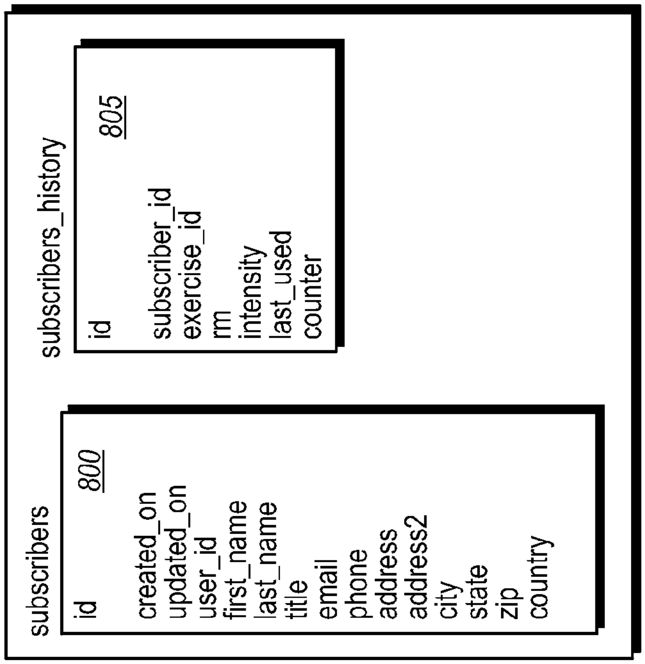
FIG. 8 illustrates various data structures describing subscribers.

Referring to FIG. 8, various data structures describing subscribers are illustrated. The data structures illustrated in FIG. 8 can be generated by receiving inputs from subscribers to the subscriber module 109 of the web application 105 illustrated in FIG. 1. Subscribers' data structures 800 can include a subscriber's data structure identifier and information describing various attributes of the particular subscriber. Subscribers' history data structures 805 can include a subscriber history data structure identifier and subscriber and exercise identifiers associating the subscriber history data structure 805 with subscribers 800 and exercise 500 data structures. The subscribers history data structure 805 can also include information describing actions and preferences of the subscriber. For example, the subscriber can specify volume control preferences to be taken in account when mixing audio media. The subscriber may also be associated with desired volume levels based on any attributes of the subscriber. Thus, the subscribers 800 and subscribers history 805 data structures can represent at least a portion of the subscriber attribute information of FIG. 2.

The information collected directly from a subscriber may be information collected when the subscriber initially logs onto the web application 205 of FIG. 2A, or may be updated over time. During an initial subscription to the web application 205, the subscriber may be queried for a variety of personal information by the subscriber module 209 of the web application 205 of FIG. 2A. Information queried may include, for example, age, weight, preferred physical exercise, preferred type of physical workout, gender, level of physical fitness, desired level of physical fitness, music genre preference, any medical conditions, identification of a preferred trainer, language preference, nationality, geographical location, knowledge of physical fitness equipment, and access to physical fitness equipment. Any of these attributes may be used to associate a media file with a desired volume level during mixing. In some embodiments, the individualized information may also include for example, a date the user's individualized information was entered, a date the user's individualized information was updated, a user identification number, the user's name, the user's title, the user's e-mail address, the user's address, and other personal information about the user.

Figure 9:
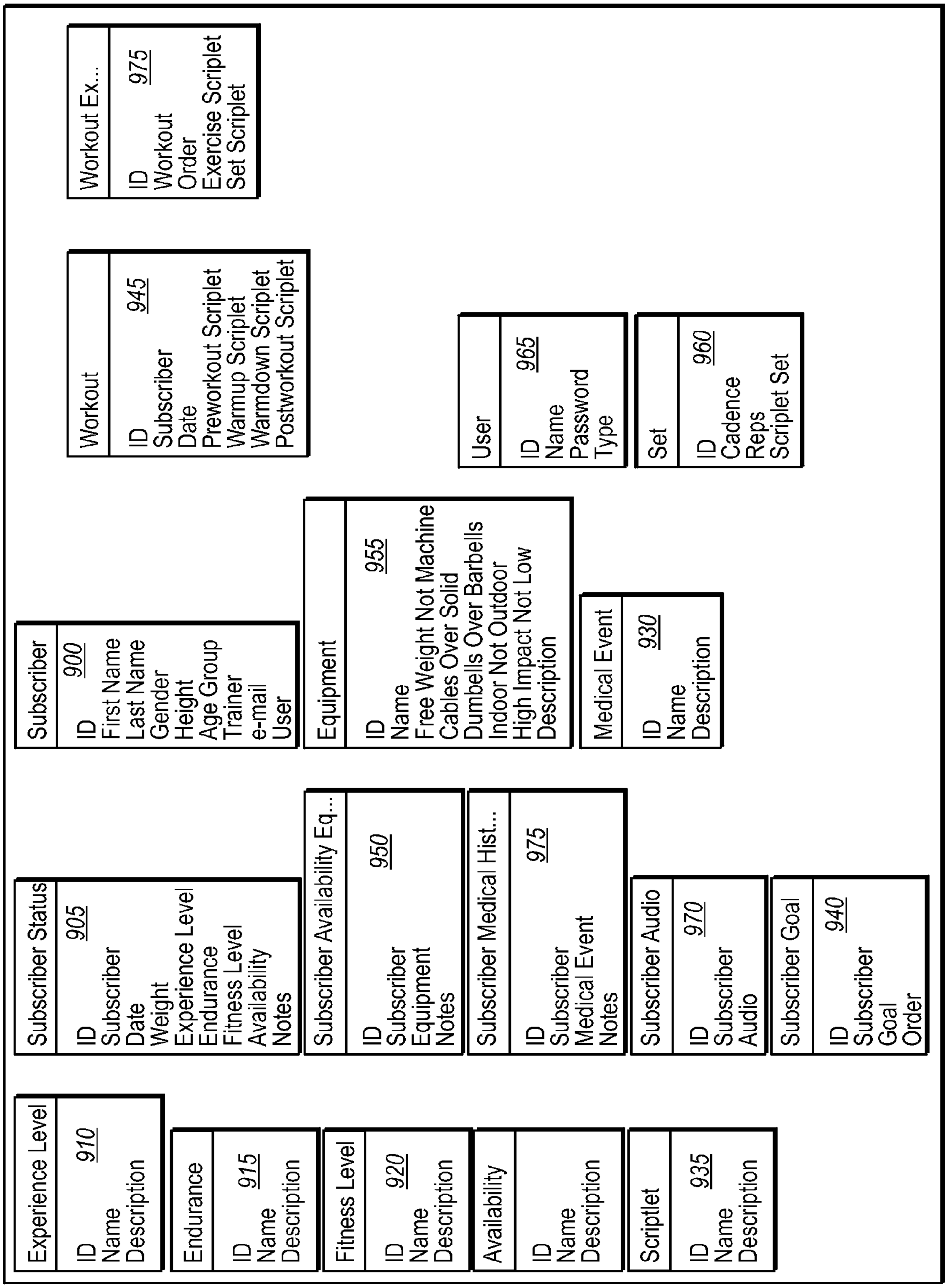
FIGS. 9 and 10 illustrate various data structures that can be generated by a knowledge based module of FIG. 2.
Figure 10:
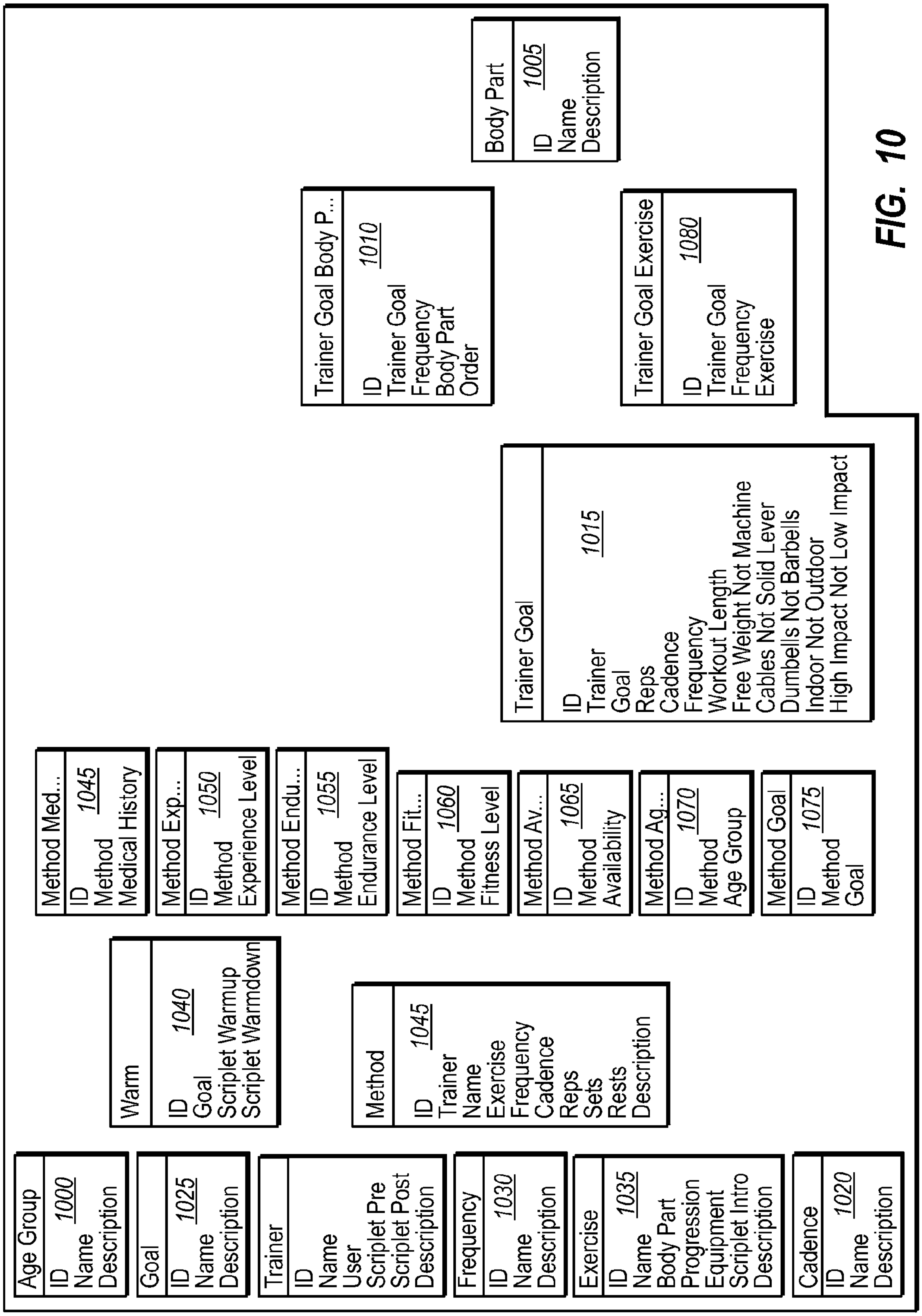

Referring to FIGS. 9 and 10, various data structures are illustrated that can be generated by the knowledge based module 240 of FIG. 2B by associating subscriber 800 and subscriber history 805 data structures generated by the subscriber module 209 with the data structures generated by the knowledge expert module 207 and trainer module 208 of the web application 205 illustrated in FIGS. 2A, 2B, and 3-8 to generate and compile the individualized media scriptlists. These scriptlists generated specify at least a portion of the media that is mixed.

Referring still to FIGS. 9 and 10, various data structures are illustrated that may be generated and associated based on a subscriber's response to various queries. Based on the subscriber's response to the queries, associated subscriber 900 and subscriber status 905 data structures can be generated and associated with experience level 910, endurance 915, fitness level 920, subscriber medical history 925, and medical event 930 data structures that describe the physical abilities of the particular subscriber. These subscriber attributes can be considered when associating a desired volume level with media during mixing. Endurance data structures 915 list at least one of all possible endurance designations used in the subscriber's status table, identifying how long they were able to workout. Experience level 910 data structures list at least one of all possible experience level designations and are used to match a subscriber's stated experience and specific exercise requirements. The Fitness level data structure 920 lists at least one of all possible fitness levels used to match subscriber's stated fitness level and specific exercise requirements (in the method table). The medical event data structure 930 lists at least one of all possible medical events a subscriber can select (defining historical medical conditions, etc.) and are used to match against trainer methods data structures (e.g., see FIG. 10). These subscriber descriptive data structures can be associated with various data structures generated for a subscriber, such as scriptlets 935, subscriber goals 940, workout 945 subscriber availability equipment 950, equipment 955, set 960, user 965, subscriber audio 970, and workout exercise 975 data structures to tailor the individualized media to the particular needs of the subscriber. The subscriber availability data structure 950 can list all possible exercise availability options (time commitment) used to identify what a subscriber's time availability is for matching the subscriber with media clips. Equipment data structures 955 list at least one of all possible equipment used in exercises and a subscriber's equipment availability designations. The subscriber goal data structure 940 lists at least one of all possible fitness goals a subscriber can select, and are used to match against trainer methods data structures. The workout exercise data structure 975 lists at least one of all possible exercises used in the system, which Trainers define their methods around. The scriptlet data structure 935 maintains all audio clips (or scriptlets), which can be physical mp3 files. This table identifies the physical file name, and further identifies its type. The set data structure is used to identify which scriptlet to use for counting through an exercise, given its cadence and reps. All of this information can be used to associate the subscriber with a particular trainer, goals, routines, activities, exercises, and so on, such that particular media scripts can be selected to create a scriptlist that identify scriptlets of media clips to create the individualized media clip.

Referring to FIG. 10, additional data structures that can be associated with a particular subscriber to match the subscriber with methods, goals, exercises and other trainer data structures are illustrated. An age group data structure 1000 associates the subscriber with one of several possible age groups used throughout the system for generating the individualized media. The ago of a subscriber can associate media audio with a desired volume level. A body part data structure 1005 lists all body parts used to identify exercise localizations and can be associated with a trainer goal body part data structure 1010 and as a result a trainer goal data structure 1015 to match body part exercises with a trainer's methodologies. A cadence data structure 1020 lists at least one of the possible speed or cadence options to define how the exercise counting is to be done, which is used in method and set data structures.

Additional trainer designated data structures can include goal 1025, frequency 1030, exercise 1035, and warm 1040 data structures. Warm data structure 1040 attributes can define which warm-up and warm-down scriptlets to select. Warm-up and warm-down scriptlists can be associated with a different desired volume level than a during-exercise desired volume level. For example, there can be goals (e.g., fat loss, fitness, build muscle, stress reduction, medical, body shaping, sport specific, activities of daily living, etc.), step (prework-out, warmup, exercise, set warmdown, postworkout, etc.), scriptlet warmup (e.g., "Warm-up" recorded media), and scriptlet warmdown (e.g., "Warm-down" recorded media).

A method data structure 1045 along with various trainer method data structures can also be generated. For example there can be method medical condition 1045, method experience level 1050, method endurance 1055, method fitness 1060, method availability 1065, method age 1070, method goal 1075, and trainer goal exercise 1080 data structures that are generated in response to trainer query responses submitted to trainer module 108 of web application 105 illustrated in FIG. 1.

Figure 11:
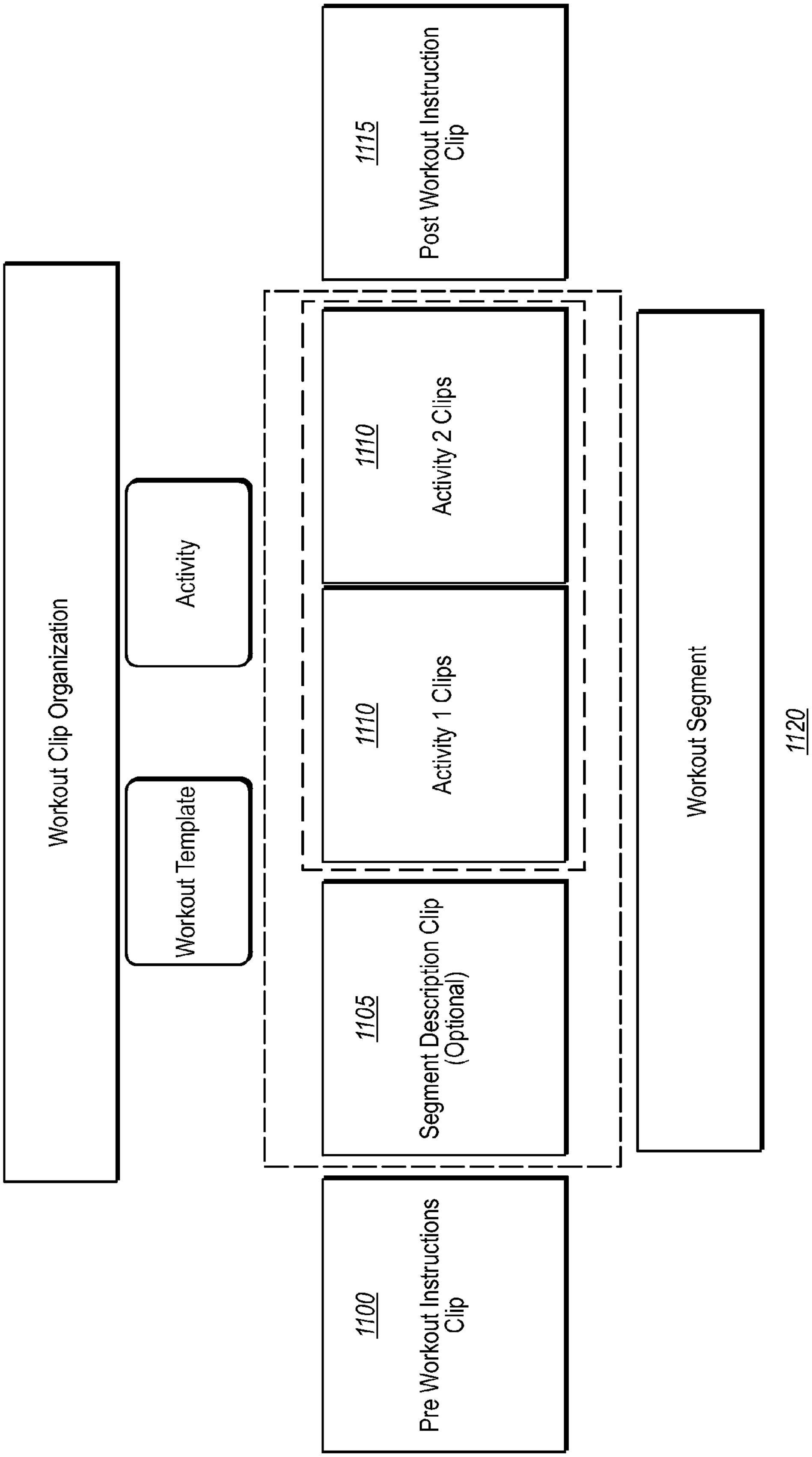
FIG. 11 illustrates a broad overview of a workout clip.
Figure 12:
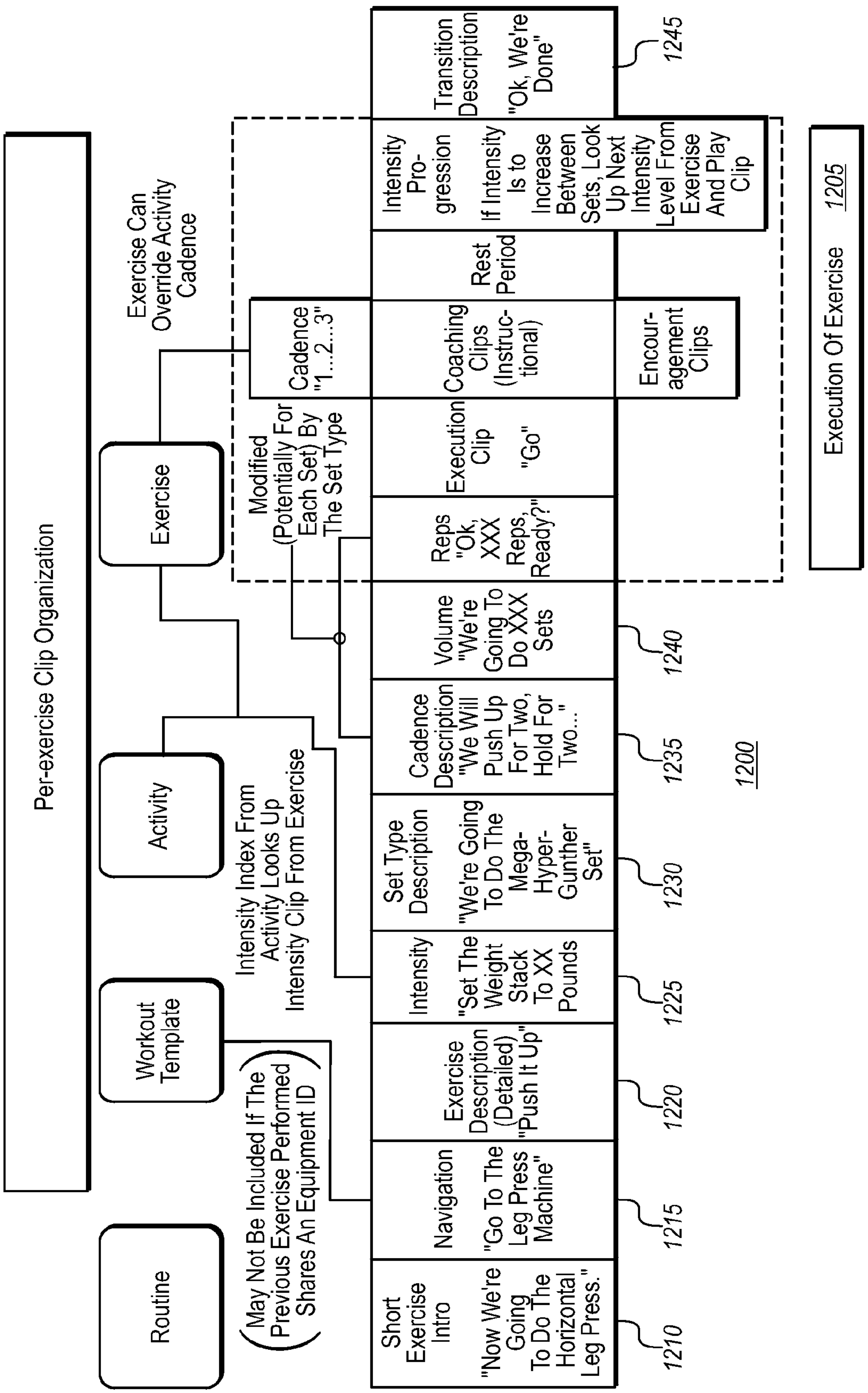
FIG. 12 illustrates a more detailed view of the contents of an exercise portion of a workout clip.
Figure 13:
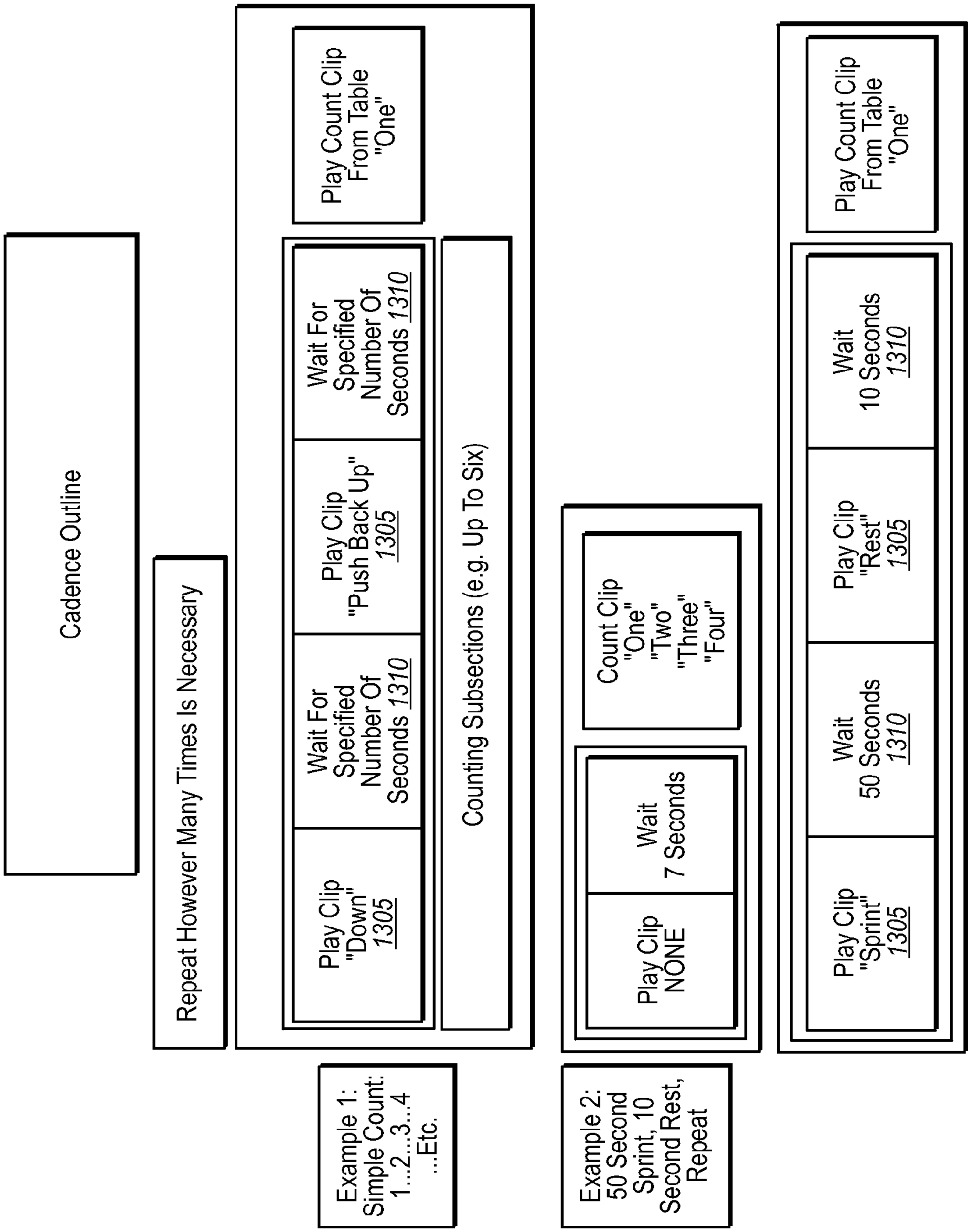
FIG. 13 illustrates a detailed view of cadence example in a workout clip.

FIGS. 11-13 illustrate examples of the contents of a workout clip, which is an example of media content. FIG. 11 is a broad overview of a workout clip 1120. FIG. 12 is a more detailed view of the contents of an exercise portion of the workout clip 1120. And FIG. 13 is a detailed view of cadence examples in the workout clip 1120.

The workout clip 1120 can be composed of various scriptlets selected by logic module 255 in FIG. 2B for example. Logic module 255 may select scriptlets to create the complete workout clip 1120 according to the methods illustrated in FIG. 2B and mixed according to the methods illustrated in FIG. 1. For example, referring to FIG. 11, a complete workout clip 1120 may contain pre-workout instruction scriptlets 1100 (such as "This Workout Will Give You Abs of Steel"), segment description scriptlets 1105 (such as "We Will Now Perform Sit-Ups"), exercise (activity) scriptlets 1110 (such as "Up, Down, Up, Down"), post-workout scriptlets 1115 (such as "Go Get Some Water"), and pause scriptlets (not shown, but can be inserted as needed), etc. Each of the different portions 1100-1115 of the clip 1120 can be associated with different desired volume levels. Cadence scriptlets may also be used to effect the difficulty, speed, repetition, etc., of a workout. These scripts can be organized as discussed above, to include a preworkout introduction warm-up, exercise, introduction, sets, warm down, and post workout conclusion. The workout clip 1120 can use the trainer designed and subscriber matched workout templates and activities discussed above to select the individual scriptlets that match the subscriber's goals and profile attributes. Of course other embodiments of the clip 1120 can include fewer or more scriptlets. Alternatively, some of the scriptlets or segments can be combined.

Referring to FIG. 12, the more detailed example of a per-exercise clip portion 1200 of work out clip 200 is illustrated. Per-exercise clips can be organized according to the template illustrated in FIG. 12 and the particular scriptlets can be selected based on the routines, workout templates, activity, and exercise data structures matched with the subscriber's profile attributes and goals using the trainer methods. The subscriber can also select a particular trainer, which can be an attribute of the subscriber and used to match the subscriber with particular scriptlets. The subscriber can also be matched with the particular trainer based on the subscriber's goals health, available equipment, and/or any other attributes of the subscriber. For example, where the subscriber has a particular health issue the subscriber can be matched with a particular trainer with goals and training philosophies tailored for the particular health issue of the subscriber. Subsequently the trainer's method data structures and scriptlets can be matched to the subscriber to create the individualized media program for the individual subscriber. Any of the inputs, preferences, and/or attributes set forth herein can be used to associate a desired volume level with media.

As indicated in FIG. 12 an exercise portion 1205 of the assembled per-exercise clip 1200 may only consist of a portion of the overall per-exercise clip 1200. Other portions of the per-exercise clip 1200 may be included as shown, such as introductions 1210, navigations 1215, exercise descriptions 1220, intensity clips 1225, descriptions of the set type 1230, cadence description describing the pace 1235, volume description 1240, and transition descriptions 1245. Thus, there can be clips that have been matched with the subscriber that give detailed information and introduction to all aspects of the individualized workout for the subscriber. Any of the segment portions defined herein can be used to associate desired volume levels with media. The scriptlets may include information from trainer information module 265, exercise information module 270, and general information module 295 of FIG. 2B. Each of the trainer information 270, exercise information 270, and general information 275, correlate with the content of an individual scriptlet.

Referring to FIG. 13, a more detailed block diagram of various clips making up two example cadence outlines are illustrated. Example 1 illustrates a simple cadence outline for a simple count type of exercise. As illustrated, the cadence clip can include various instruction clips 1305 interposed with various pause 1310 clips. The duration of the various instruction clips 1305 pause clips 1310 can be dependent on any variable in the system. Volume of media. Such as instruction and background media can also be varied during mixing based on any criteria, or combination of criteria, set forth herein. For example, the type of exercise, philosophies of the trainers, and attributes of the subjects can be matched with different instruction clips 1305 pause clips 1310, and volume to control the pace, intensity, and timing of the exercise according to the cadence example clips shown in FIG. 13.

The cadence clips can include more detailed instructions tailored to any aspect of an individualized media program. The cadence clips can include instructions and volume levels that are tailored to the type of exercise, goals, subscriber attributes, trainer, etc. Example 2 illustrated in FIG. 13 shows a block diagram of a sprint-rest cadence clip for a particular exercise. As shown, the instruction clips 1305 and pause clip 1310 durations are tailored for the particular type of exercise and duration of activity that is conduced in response to the respective instruction according to this example.

Referring again to the example process of FIG. 2B, the logic module 255 selects, organizes, and arranges a scriptlist of scriptlets according to the information for each scriptlet to create a complete workout clip, such the clips illustrated in FIGS. 11-13, with the appropriate amount of scriptlets in the appropriate order according to the desired workout. As discussed above, the workout clip is associated with personal information, trainer information, exercise information, volume information and general information to create a workout clip specifically personalized to the individual subscriber.

The scriptlist generated contains a list of identifying information for each scriptlet necessary to produce the final workout clip (e.g., see FIG. 11). Media clip creation module 260 uses the information from the scriptlist to retrieve the appropriate scriptlets from the appropriate modules and data bases storing the scriptlets, and combines, or mixes, the individual scriptlets according to the scriptlist to create complete workout clip. Media clip creation module 260 may also use media supplied by the subscriber 250 to mix a complete workout clip with background music selected by the subscriber 250, further personalizing the media clip. Music may, however, be selected by any entity of the system, such as subscriber, trainer, and knowledge engineer. The volume of the background music and instruction can be controlled as illustrated in FIG. 1.

A workout clip may be stored on the subscriber's 250 computer, accessible by the subscriber 250, and associated with a specific media organization program such as itunes®, or other similar software, for download of music files to a personal media device such as an ipod®, mp3 player, or other electronic device. A workout clip may then be played and utilized by subscriber 250 to guide or assist with a workout. It should be appreciated that individualized video clips and combined video and audio clips of any format can also be assembled using the teachings set forth herein.

Figure 14:
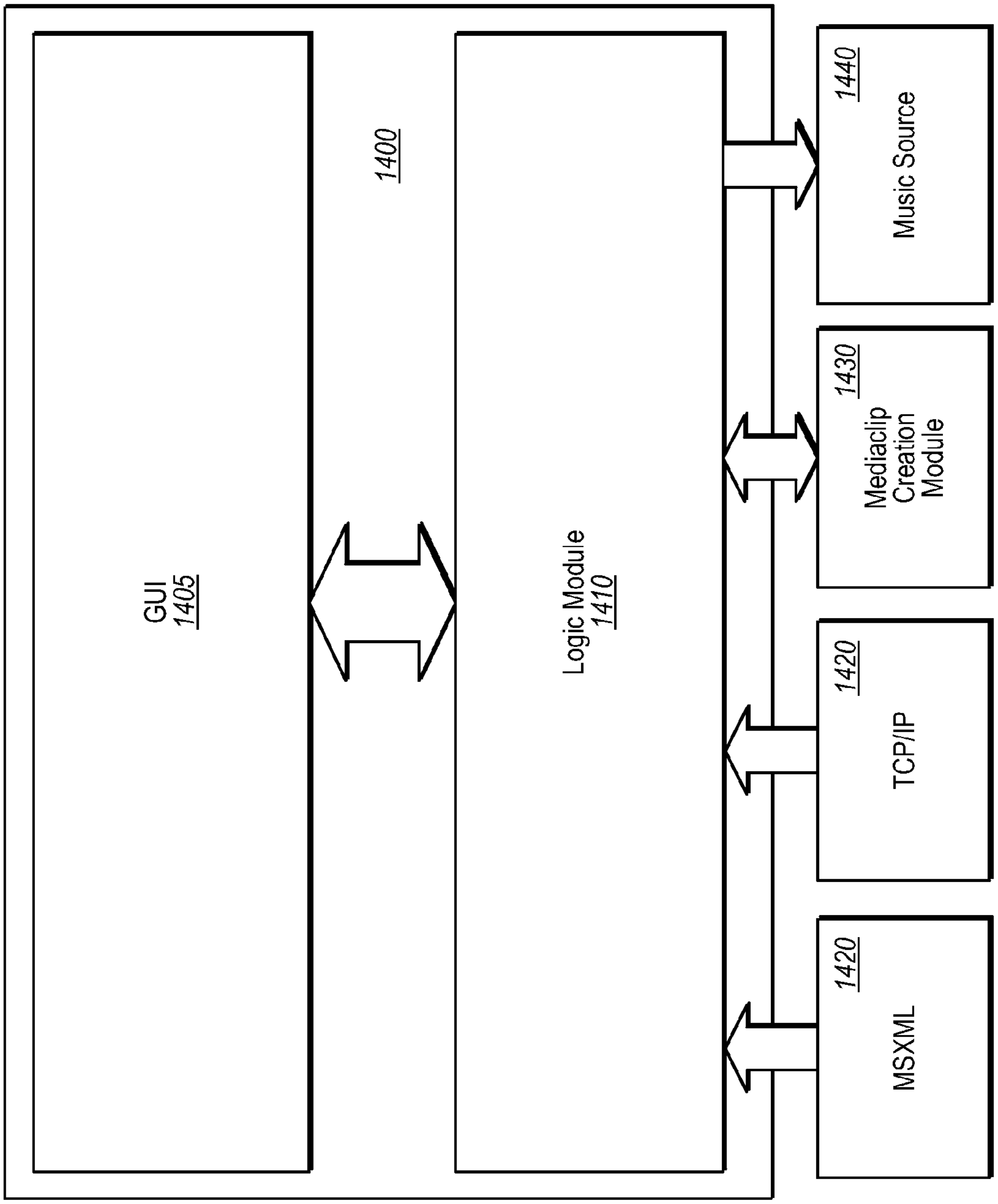
FIG. 14 illustrates a control flow schematic of the interaction between a subscriber and a system for performing the methods discussed herein.

FIG. 14 illustrates a control flow schematic of the interaction between a subscriber and a system for performing the methods discussed herein. In one embodiment, the subscriber may access a computer running subscriber software 1400. As illustrated, a "GUI" 1405, which is a pluggable skin (a graphical representation displayed on a monitor connected to a computer running subscriber software 1400 such as the interactive GUI of subscriber module 209 illustrated in FIG. 1A, which may be modified by each subscriber. Communicating with the GUI 1405 is a logic module 1410. Logic module 1410 may perform all or a portion of the functions performed by logic module 150 in FIG. 2A. Subscriber software 1400 may communicate with knowledge base module 240 of FIG. 2B and the internet through interfaces, such as a TCP/IP interface 1420. Media clip creation module 1430, which can be Bassell from Unseen Developments for example, mixes the media clips received according to the scriptlist. A music source 1440, such as an itunes object interface with itunes®, provides the music for mixing with the individualized media. In some embodiments, a workout clip may be designed specifically for a type of exercise enjoyed by a subscriber, such as running, weight lifting, yoga, pilates, etc., and may be performed at any time and in any place convenient and suitable for the exercise. Content and attributes can associate desired volume levels with media during mixing.

Referring again to the example process of FIG. 2B, the logic module 255 selects, organizes, and arranges a scriptlist of scriptlets according to the information for each scriptlet to create a complete workout clip, such the clips illustrated in FIGS. 11-13, with the appropriate amount of scriptlets in the appropriate order according to the desired workout. As discussed above, the workout clip is associated with personal information, trainer information, exercise information, and general information to create a workout clip specifically personalized to the individual subscriber.

The scriptlist generated contains a list of identifying information for each scriptlet necessary to produce the final workout clip (e.g., see FIG. 11). Media clip creation module 260 uses the information from the scriptlist to retrieve the appropriate scriptlets from the appropriate modules and data bases storing the scriptlets, and combines, or mixes, the individual scriptlets according to the scriptlist to create complete workout clip. Media clip creation module 260 may also use media supplied by the subscriber 250 to mix a complete workout clip with background music selected by the subscriber 250, further personalizing the media clip. Music may, however, be selected by any entity of the system, such as subscriber, trainer, and knowledge engineer.

A workout clip may be stored on the subscriber's 250 computer, accessible by the subscriber 250, and associated with a specific media organization program such as itunes®, or other similar software, for download of music files to a personal media device such as an ipod®, MP3 player, or other electronic device. A workout clip may then be played and utilized by subscriber 250 to guide or assist with a workout. It should be appreciated that individualized video clips and combined video and audio clips of any format can also be assembled using the teachings set forth herein.

The embodiments described herein may include the use of a special purpose or general-purpose computer including various computer hardware or software modules, as discussed in greater detail below.

Although more specific reference to advantageous features are described in greater detail below with regards to the Figures, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The embodiments described herein may also be described in terms of methods comprising functional steps and/or non-functional acts. Some of the following sections provide descriptions of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flow diagrams—is used to indicate the desired specific use of such terms.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method of mixing separate audio media for a subscriber comprising:

identifying separate audio media stored in at least one database remote from the subscriber based at least partially on subscriber attribute data previously stored in a database of the at least one database;

adjusting a volume attribute of at least one of the audio media, adjusting a volume attribute including:

determining a volume level of each of the separate audio media;

normalizing volume levels of the separate audio media after determining a volume level of each of the separate audio media;

comparing the volume level of the at least one of the separate audio media to an associated desired volume level determined prior to determining a volume level of each of the separate audio media;

and increasing or decreasing the volume level of the at least one of the separate audio media based on a result of the comparison of the volume level of the at least one audio media with the associated desired volume level; and combining the separate audio media to produce a combined audio media.

2. The method of claim 1, wherein the volume levels are normalized by multiplying the volume level of each audio media by a suitable constant or scalar so that the volume level of each audio media then has norm one.

3. The method of claim 1, wherein the associated desired volume level compared to the at least one of the separate audio media is associated with the at least one of the separate audio media based on a content of the at least one of the separate audio media.

4. The method of claim 1, wherein the volume level of at least two of the separate audio media is compared to at least two different associated desired volume levels based on content of the at least two of the separate audio media.

5. The method of claim 1, wherein a first of the separate audio media includes background music content and the first of the separate audio media is compared to a first associated desired volume level, and wherein a second of the separate audio media includes instruction content and the second of the separate audio media is compared to a second associated desired volume level.

6. The method of claim 5, wherein the volume level of the second associated desired volume level is greater than the volume level of the first associated desired volume level.

7. The method of claim 6, wherein the second audio media includes exercise instruction content.

8. The method of claim 7, wherein the second associated desired volume level is selected according to an associated type of exercise of the exercise instruction content.

9. The method of claim 8, wherein an associated desired volume level associated with during-exercise content is greater than an associated desired volume level associated with between-exercise audio content, pre-exercise audio content, and/or post-exercise audio content.

10. A media mixing and production module comprising:

a computer readable medium storing instructions that when executed by a processor causes the processor to implement an audio normalizing and mixing module that accesses separate audio media and combines the separate audio media, the audio mixing module including:

a volume adjusting function configured to determine a volume level of each audio media, normalize the volume levels of the separate audio media after the volume level of each audio media has been determined, compare the volume level of at least one of the separate audio media to an associated desired volume level defined, and increase or decrease the volume level of the at least one of the separate audio media based on a result of the comparison; and an audio mixing function configured to combine the separate audio media linearly to produce a combined audio media.

11. The media mixing and production module of claim 10, wherein the volume adjusting function is configured to normalize the volume levels of the separate audio media by multiplying the volume level of each audio media by a suitable constant or scalar so that the volume level of each audio media then has norm one.

12. The media mixing and production module of claim 10, wherein the associated desired volume level is associated with the at least one of the separate audio media based on a content of the at least one of the separate audio media.

13. The media mixing and production module of claim 10, wherein the volume adjusting function is further configured to compare the volume level of at least two of the separate audio media to at least two different associated desired volume levels based on content of the at least two of the separate audio media.

14. The media mixing and production module of claim 10, wherein a first of the separate audio media includes background music content and the volume adjusting function is configured to compare the first of the separate audio media to a first associated desired volume level, and wherein a second of the separate audio media includes instruction content and the volume adjusting function is configured to compare the second of the separate audio media to a second associated desired volume level.

15. The media mixing and production module of claim 14, wherein the volume level of the second associated desired volume level is greater than the volume level of the first associated desired volume level.

16. The media mixing and production module of claim 15, wherein the second audio media includes exercise instruction content.

17. The media mixing and production module of claim 16, wherein the second associated desired volume level is selected according to an associated type of exercise of the exercise instruction content.

18. The media mixing and production module of claim 17, wherein an associated desired volume level associated with during-exercise content is greater than an associated desired volume level associated with between-exercise audio content, pre-exercise audio content, and/or post-exercise audio content.

* * * * *